(12) United States Patent
Yoshii

(10) Patent No.: US 8,049,694 B2
(45) Date of Patent: Nov. 1, 2011

(54) ELECTRO-OPTICAL DEVICE AND ELECTRONIC APPARATUS INCLUDING THE SAME

(75) Inventor: Masahito Yoshii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 869 days.

(21) Appl. No.: 11/985,505

(22) Filed: Nov. 15, 2007

(65) Prior Publication Data

US 2008/0123008 A1 May 29, 2008

(30) Foreign Application Priority Data

Nov. 27, 2006 (JP) .................................. 2006-318115

(51) Int. Cl.
*G09G 3/36* (2006.01)
(52) U.S. Cl. .......................................... 345/87; 345/204
(58) Field of Classification Search .................... 345/98, 345/100, 205, 87, 204; 349/151; 257/340
See application file for complete search history.

(56) References Cited

U.S. PATENT DOCUMENTS

| | | | | |
|---|---|---|---|---|
| 6,707,102 | B2 * | 3/2004 | Morikawa et al. ............ | 257/340 |
| 7,061,567 | B2 * | 6/2006 | Murade ......................... | 349/151 |
| 7,298,356 | B2 | 11/2007 | Murade | |
| 7,352,005 | B2 | 4/2008 | Yamasaki | |
| 2005/0068310 | A1 * | 3/2005 | Ishii .............................. | 345/204 |

FOREIGN PATENT DOCUMENTS

| | | |
|---|---|---|
| JP | 11-133456 A | 5/1999 |
| JP | 11-194360 A | 7/1999 |
| JP | 2002-49330 A | 2/2002 |
| JP | 2002-156653 A | 5/2002 |
| JP | 2004-354969 A | 12/2004 |
| JP | 2005-077484 A | 3/2005 |
| JP | 2006-317903 A | 11/2006 |

\* cited by examiner

*Primary Examiner* — Quan-Zhen Wang
*Assistant Examiner* — Troy Dalrymple
(74) *Attorney, Agent, or Firm* — AdvantEdge Law Group, LLC

(57) ABSTRACT

An electro-optical device includes a substrate and the following elements. Pixels are disposed in a pixel area on the substrate. Scanning lines and data lines are disposed in the pixel. An image signal line is disposed in a peripheral area located around the pixel area to supply an image signal. A sampling circuit is disposed in the peripheral area and includes transistors disposed in association with corresponding data lines. Each transistor including a semiconductor layer having (i) a source region connected to a source wiring which is electrically connected to the image signal line and which is disposed in a first direction in which the data lines are extended, (ii) a drain region connected to a drain wiring which is electrically connected to the corresponding data line and which is disposed in the first direction, and (iii) a channel region formed between the source region and the drain region. A layer is disposed above the semiconductor layer. A light-shielding film is disposed over the layer and at least in part of a gap region between adjacent transistors of the transistors in plan view. The light-shielding film is at least partially overlapping with the semiconductor layers of the adjacent transistors in plan view.

10 Claims, 8 Drawing Sheets

ELECTRO-OPTICAL DEVICE AND ELECTRONIC APPARATUS INCLUDING THE SAME

BACKGROUND

1. Technical Field

The present invention relates to a technical field of electro-optical devices, such as liquid crystal devices, and electronic apparatuses, such as liquid crystal projectors, including such electro-optical devices.

2. Related Art

Generally, such electro-optical devices are driven on the basis of image signals supplied from an external circuit to image signal lines through external circuit connecting terminals. For example, in a liquid crystal device, image signals are supplied from image signal lines via a sampling circuit to a plurality of data lines that are laid out in an image display area on a substrate. The sampling circuit is disposed in a peripheral area located around the image display area and includes a plurality of sampling switches, one sampling switch being associated with each data line. The sampling switch is generally formed of a single-channel or complementary thin film transistor (TFT). An image signal line is connected to the source of the sampling switch, a data line is connected to the drain of the sampling switch, and a sampling signal line for supplying a sampling signal is connected to the gate of the sampling switch. Concerning such sampling switches, for example, JP-A-2002-49330 discloses a technique for providing a shielding electrode between adjacent sampling switches to electrostatically shield the data line connected to the drain of one sampling switch and the image signal line connected to the source of the adjacent sampling switch.

The sampling switches are disposed with regular gaps therebetween such that they can be associated with the corresponding data lines. This causes a technical problem in that light leakage occurs in the gap between adjacent sampling switches. Accordingly, when displaying an image, in a peripheral area through which light should not pass, a streak-like white portion may be displayed at a position corresponding to the gap between adjacent sampling switches.

SUMMARY

An advantage of some aspects of the invention is that it provides an electro-optical device that can reduce the number of occurrences of light leakage in gaps between adjacent sampling switches so that high-quality images can be displayed and also provides an electronic apparatus including such an electro-optical device.

According to an aspect of the invention, there is provided an electro-optical device including a substrate and also the following elements. A plurality of pixels are disposed in a pixel area on the substrate. A plurality of scanning lines and a plurality of data lines are disposed in a pixel area. An image signal line is disposed in a peripheral area located around the pixel area to supply an image signal. A sampling circuit is disposed in the peripheral area and includes a plurality of transistors disposed in association with corresponding data lines. Each transistor includes a semiconductor layer having (i) a source region connected to a source wiring which is electrically connected to the image signal line and which is disposed in a first direction in which the plurality of data lines are extended, (ii) a drain region connected to a drain wiring which is electrically connected to the corresponding data line and which is disposed in the first direction, and (iii) a channel region formed between the source region and the drain region. A layer is disposed above the semiconductor layer. A light-shielding film is disposed over the layer and disposed at least in part of a gap region between adjacent transistors of the plurality of transistors in plan view, the light-shielding film being at least partially overlapped with the semiconductor layers of the adjacent transistors in plan view.

According to the above-described electro-optical device, the drain wirings and the source wirings of the transistors, which serve as sampling switches, forming the sampling circuit are disposed in the direction in which the data lines are extended, e.g., the column direction or the Y direction. The transistors are disposed in the row direction or the X direction in association with the corresponding data lines.

In the operation of the above-described electro-optical device, sampling signals are supplied from the data line drive circuit to the gates of the plurality of transistors. Image signals supplied to the image signal lines are sampled by the corresponding transistors in accordance with the sampling signals and are then supplied to the corresponding data lines. Meanwhile, scanning signals are sequentially supplied from scanning line drive circuits to the corresponding scanning lines. With this operation, pixels including pixel switching elements, pixel electrodes, storage capacitors, etc. perform an electro-optical operation, such as driving of the liquid crystal, in the units of pixels. As a result, image display in a pixel area can be implemented.

In an embodiment of the invention, particularly, a light-shielding film is disposed on a layer higher than the semiconductor layer and at least in part of a gap region between adjacent transistors of a plurality of transistors. The light-shielding film is formed of a light-shielding film, such as an opaque metal. Additionally, the light-shielding film is formed such that it is partially overlapped with two adjacent transistors and such that it can cover the gap region between the two adjacent transistors when viewed from the top of the substrate. Accordingly, the number of occurrences of light leakage in the gap region between adjacent transistors can be reduced. More specifically, oblique light may be contained (about ten-odd per cents) in light emitted from an external light source and incident on the liquid crystal device, or light may be reflected on the back surface of the substrate or light emitted from another liquid crystal device in an electronic apparatus, such as a multi-panel projector, may pass through a synthetic optical system. Such light may be reflected by another part of the liquid crystal device, resulting in diffused reflected light or stray light, which may pass through the gap region between adjacent transistors and output to the outside of the liquid crystal device. According to the above-configured electro-optical device, the number of occurrences of light leakage under this situation can be reduced. Thus, undesirable phenomena occurring in displaying images, such as a streak-like white portion displayed at a position corresponding to the gap region in the peripheral area, can be eliminated. As a result, high-quality image display can be implemented.

Additionally, the light-shielding film functions as an electromagnetic shielding film that can reduce the electromagnetic interference between adjacent transistors or between the transistors and wiring or various electronic elements disposed on a layer higher than the transistors.

As described above, according to the above-described electro-optical device, the light-shielding film is provided. Accordingly, the number of occurrences of light leakage in a gap region between adjacent transistors in a sampling circuit can be reduced. As a result, high-quality images can be displayed.

In one mode of the electro-optical device, it is preferable that the source wiring, the drain wiring, and the light-shielding film be formed with an identical film.

In this mode, the light-shielding film is formed of the same film as the source wiring and the drain wiring, which is made of a metallic film, such as an aluminum film. Such a metallic film has a low wiring resistance suitable for wiring. Thus, the laminated structure on the substrate and the manufacturing process can be simplified. In an aspect of the invention, "the same film" means a film formed at the same opportunity in the manufacturing process and formed of the same material. It is, however, not necessary that such a film be formed as one continuous film, and may be divided into several portions.

Additionally, the electromagnetic interference between adjacent drain wirings or between adjacent source wiring and drain wiring can be reduced or prevented by the light-shielding film, which is formed on the same layer as those wirings. That is, the light-shielding film functions as an electromagnetic shielding film that can reduce or prevent the electromagnetic interference between adjacent drain wirings or between adjacent source wiring and drain wiring. Thus, the potential of the data lines electrically connected to the drain wirings can be prevented from being changed, which would be caused by the interference between adjacent drain wirings or between adjacent source wiring and drain wiring. As a result, the number of occurrences of irregularities in the luminance represented by streak-like white portions at positions corresponding to the data lines can be reduced.

In another mode of the electro-optical device, it is preferable that the electro-optical device further include a plurality of lower light-shielding films disposed on a layer lower than the semiconductor layer and disposed with the gap region such that each lower light-shielding film is overlapped with the corresponding semiconductor layer.

In this mode, it is possible to prevent light reflected on the back surface of the substrate or light emitted from another liquid crystal device in an electronic apparatus, such as a multi-panel projector, and passing through a synthetic optical system from being incident on the plurality of transistors forming the sampling circuit. As a result, the generation of an optical leakage current caused by the above-described returned light in the transistors can be suppressed, which would otherwise cause the transistors to malfunction.

Since the lower light-shielding films are located with the gap region therebetween, cracks in the lower light-shielding films, which would occur in a case where the plurality of lower light-shielding films are formed as one continuous film, can be suppressed. This increases the reliability of the liquid crystal device.

Additionally, the provision of the lower light-shielding films can inhibit diffused reflected light or stray light from emitting from a region where the semiconductor layer in the sampling circuit is formed.

In the mode in which the plurality of lower light-shielding films are disposed, it is preferable that the light-shielding film be at least partially overlapped with adjacent lower light-shielding films of the plurality of lower light-shielding films.

In this case, the provision of the light-shielding film and the lower light-shielding films can suppress diffused reflected light or stray light from emitting from the peripheral area more reliably.

In the mode in which the plurality of lower light-shielding films are disposed, it is preferable that each of the plurality of transistors include a gate electrode which is disposed on a layer higher than the semiconductor layer and which is overlapped with the channel region, and that a shielding wiring, which is formed of the same film as the film forming at least one of the gate electrode and the lower light-shielding film, be disposed in the gap region.

In this case, the provision of the shielding wiring can reduce or prevent the electromagnetic interference between adjacent transistors. This can inhibit or prevent the potential of the data lines electrically connected to the adjacent transistors from being changed.

In another mode of the electro-optical device, it is preferable that the light-shielding film be maintained at a predetermined potential.

In this mode, since the predetermined potential is supplied to the light-shielding film, it is possible to prevent the potential of the light-shielding film from being changed, which would be caused by the electromagnetic interference from the source wiring or drain wiring. Accordingly, the function of the light-shielding film as the electromagnetic shielding film can be enhanced. Thus, the number of occurrences of the electromagnetic interference between two adjacent drain wirings can further be reduced. In an aspect of the invention, the "predetermined potential" means a potential which is fixed at least in predetermined cycles, regardless of the content of image data. For example, as in a ground potential, the predetermined potential may be totally a fixed potential along the time axis. Alternatively, as in a common potential or a counter electrode potential, the predetermined potential may be fixed in predetermined cycles along the time axis, such as the potential is fixed at a first fixed potential in the odd-numbered fields of an image signal, while the potential is fixed at a second fixed potential in the even-numbered fields of the image signal.

In the mode in which the light-shielding film is maintained at a predetermined potential, it is preferable that the potential of the image signal be inverted between a high-potential positive polarity and a low-potential negative polarity with respect to a common potential in predetermined cycles and that the light-shielding film be maintained at the common potential as the predetermined potential.

In this mode, even when an inversion drive method is employed in which the potential polarity of an image signal supplied to the corresponding pixels is inverted with respect to the common potential, the light-shielding film can function as an electromagnetic shielding film. That is, the light-shielding film is maintained at the common potential, which is used as the reference for the polarity inversion of the image signal. Accordingly, the potential difference between the light-shielding film and the drain wiring or the source wiring can be made smaller, compared with a case where the light-shielding film is maintained at a potential different from the common electrode. As a result, the electromagnetic interference between the light-shielding film and the drain wiring or the source wiring can be reduced or prevented.

As the inversion drive method, the following 1H-inversion drive method may be employed. During the display of an image signal in one frame or one field, pixels located in the odd-numbered rows are driven with a positive potential polarity with respect to the common potential, while pixels located in the even-numbered rows are driven with a negative potential polarity with respect to the common potential. Then, during the display of the subsequent frame of field, conversely, the pixels located in the even-numbered rows are driven with the positive potential polarity with respect to the common potential, while the pixels located in the odd-numbered rows are driven with the negative potential polarity with respect to the common potential. That is, the potential polarity of the image signal is inverted so that the potential with the same polarity is supplied to the pixels in one row, while the potential with the polarity different from that supplied to the above row of pixels is supplied to the pixels in the adjacent row. The relationship between the positive and negative potential polarities is inverted in frame or field cycles. Alternatively, the 1S-inversin drive method in which the potential polarities are alternately inverted between columns, or the dot inversion method in which the potential polarities are alternately inverted between pixels may be employed.

According to another aspect of the invention, there is provided an electronic apparatus including the electro-optical device.

It is possible to provide various types of electronic apparatuses that can implement high-quality display, such as projection-type display apparatuses, cellular telephones, electronic personal organizers, word-processors, view-finder-type and monitor-direct-view-type video cassette recorders, workstations, videophones, point-of-sale (POS) terminals, devices provided with touch panels, etc. It is also possible to provide electrophoretic apparatuses, such as electronic paper, as the electronic apparatuses.

Further features and advantages of the invention will become apparent from the following description of exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention is described below in detail with reference to the accompanying drawings through illustration of preferred embodiments. In the following embodiments, an electro-optical device is discussed in the context of a TFT-active-matrix-driven liquid crystal device having a built-in drive circuit.

First Embodiment

A liquid crystal device in accordance with a first embodiment of the invention is described below with reference to FIGS. 1 through 6.

Figure 1:
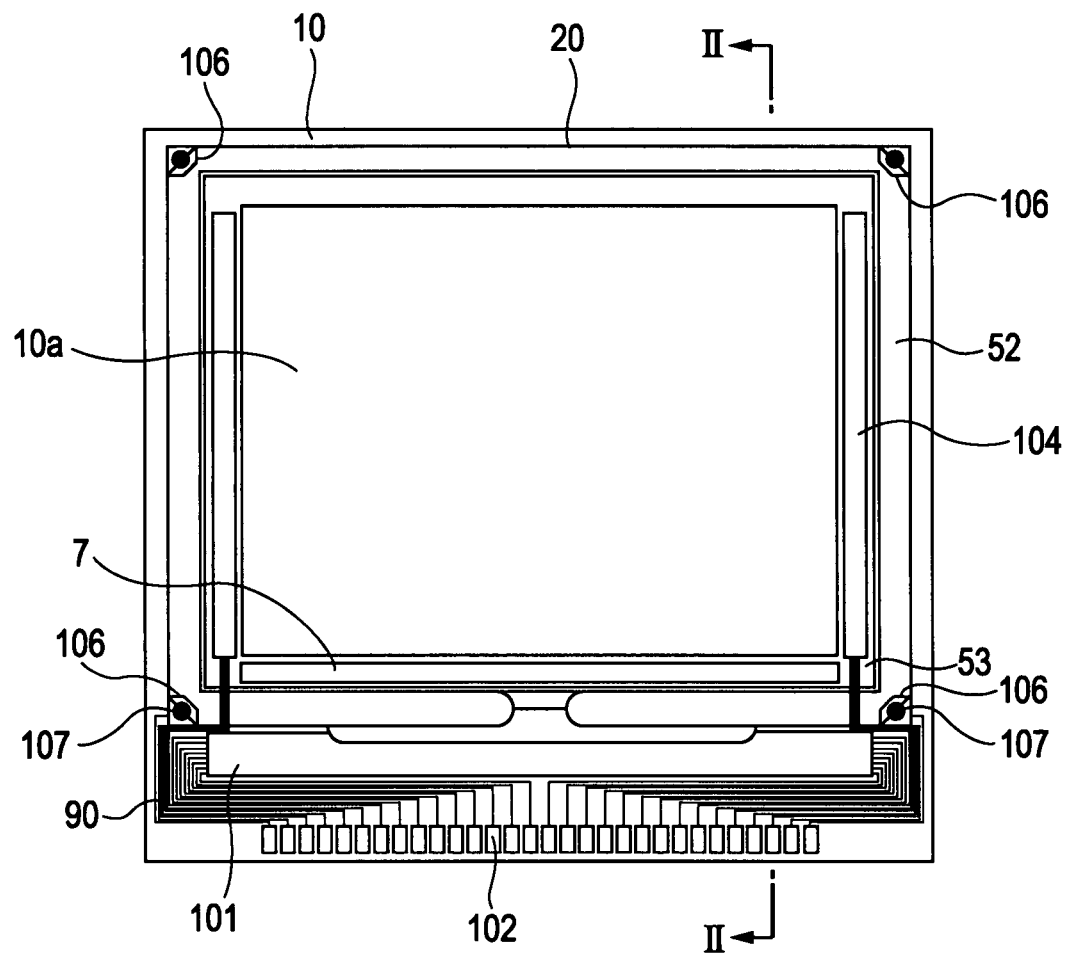
FIG. 1 is a plan view illustrating the overall configuration of a liquid crystal device in accordance with a first embodiment of the invention.

The overall configuration of the liquid crystal device in accordance with the first embodiment is first discussed below with reference to FIGS. 1 and 2. FIG. 1 is a plan view illustrating the configuration of the liquid crystal device in accordance with the first embodiment, and FIG. 2 is a sectional view taken on line II-II of FIG. 1.

Figure 2:
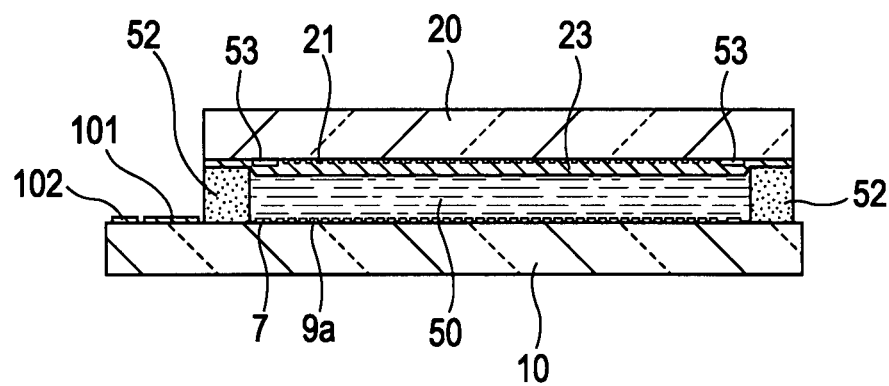
FIG. 2 is a sectional view taken on line II-II of FIG. 1.

In the liquid crystal device shown in FIGS. 1 and 2, a TFT array substrate 10 and a counter substrate 20 are disposed opposite each other. A liquid crystal layer 50 is sealed between the TFT array substrate 10 and the counter substrate 20. The TFT array substrate 10 and the counter substrate 20 are bonded to each other by a sealing member 52 provided in a sealing region of a peripheral area located around an image display area 10a. The image display area 10a is an example of a "pixel area" in embodiments of the invention.

In FIG. 1, a frame-like light-shielding film 53, which is made of a light-shielding metallic film, defining the frame-like portion of the image display area 10a is disposed in parallel to the inner portion of the sealing region in which the sealing member 52 is provided. The frame-like light-shielding film 53 is located on the side close to the counter substrate 20. In this embodiment, the peripheral area is defined as an area including the frame-like portion and farther outward than the frame-like portion when viewed from the center of the TFT array substrate 10. That is, the peripheral area is the area other than the image display area 10a on the TFT array substrate 10, which is the area through which light does not pass.

In part of the peripheral area located outside the sealing region in which the sealing member 52 is disposed, a data line drive circuit 101 and external circuit connecting terminals 102 are disposed on one side of the TFT array substrate 10. A sampling circuit 7 is disposed farther inward than the sealing region on the same side on which the data line drive circuit 101 and the external circuit connecting terminals 102 are disposed. The sampling circuit 7 is covered with the frame-like light-shielding film 53. Scanning line drive circuits 104 are disposed farther inward than the sealing region along two sides adjacent to the side on which the data line drive circuit 101 and the external circuit connecting terminals 102 are disposed. The scanning line drive circuits 104 are also covered with the frame-like light-shielding film 53. On the TFT array substrate 10, conducting terminals 106 for connecting the TFT array substrate 10 and the counter substrate 20 with conducting members 107 are disposed in the portion corresponding to the four corners of the counter substrate 20. With this arrangement, the TFT array substrate 10 and the counter substrate 20 can be electrically connected.

On the TFT array substrate 10, a relay wiring pattern 90 is disposed for electrically connecting the external circuit connecting terminals 102, the data line drive circuit 101, the scanning line drive circuits 104, and the conducting terminals 106.

In FIG. 2, on the TFT array substrate 10, the following laminated structure is formed. In the laminated structure, pixel switching TFTs, which serve as pixel switching elements, and wiring patterns, such as scanning lines and data lines, are integrated. In the image display area 10a, pixel electrodes 9a are disposed on a layer higher than the pixel switching TFTs and wiring patterns, such as the scanning lines and the data lines. An alignment film is formed on the pixel electrodes 9a. A light-shielding film 23 is formed on the counter substrate 20 facing the TFT array substrate 10. Counter electrodes 21, which are made from a transparent material, such as indium tin oxide (ITO), are formed on the light-shielding film 23 facing the pixel electrodes 9a. An alignment film is formed on the counter electrodes 21. The liquid crystal layer 50 is formed of one type or a mixture of a plurality of types of nematic liquid crystals, and forms a predetermined alignment condition between a pair of alignment films.

In this embodiment, it is assumed that light is incident on the liquid crystal layer 50 corresponding to the image display area 10a through the counter substrate 20 and is emitted from the TFT array substrate 10 as display light.

On the TFT array substrate 10, in addition to the data line drive circuit 101 and the scanning line drive circuits 104, an inspection circuit or an inspection pattern for checking the quality of the liquid crystal device or checking for defects during the manufacturing of or when shipping the liquid crystal device may be disposed, though they are not shown.

Figure 3:
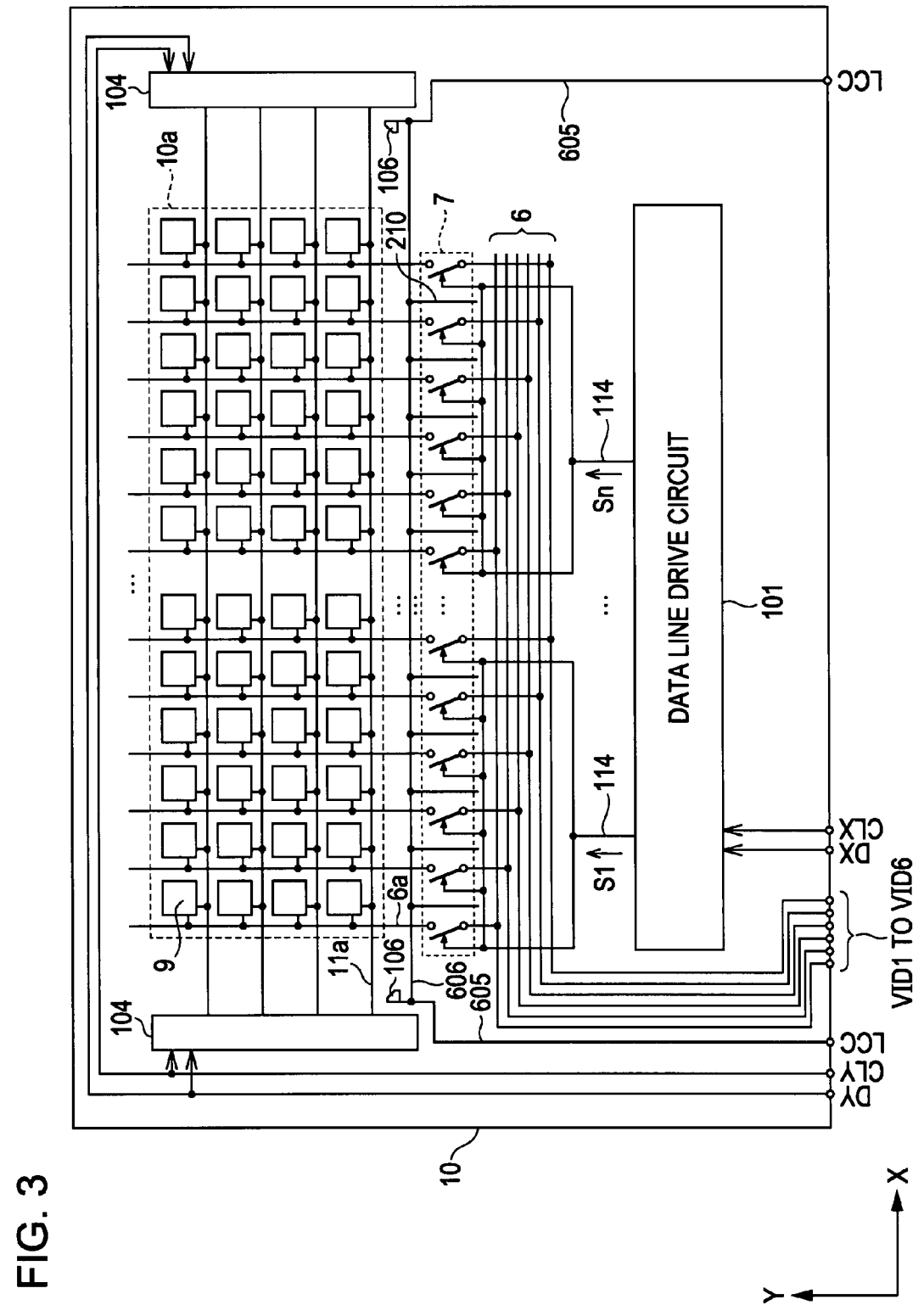
FIG. 3 is a schematic diagram illustrating the electrical configuration of the liquid crystal device in accordance with the first embodiment of the invention.
Figure 4:
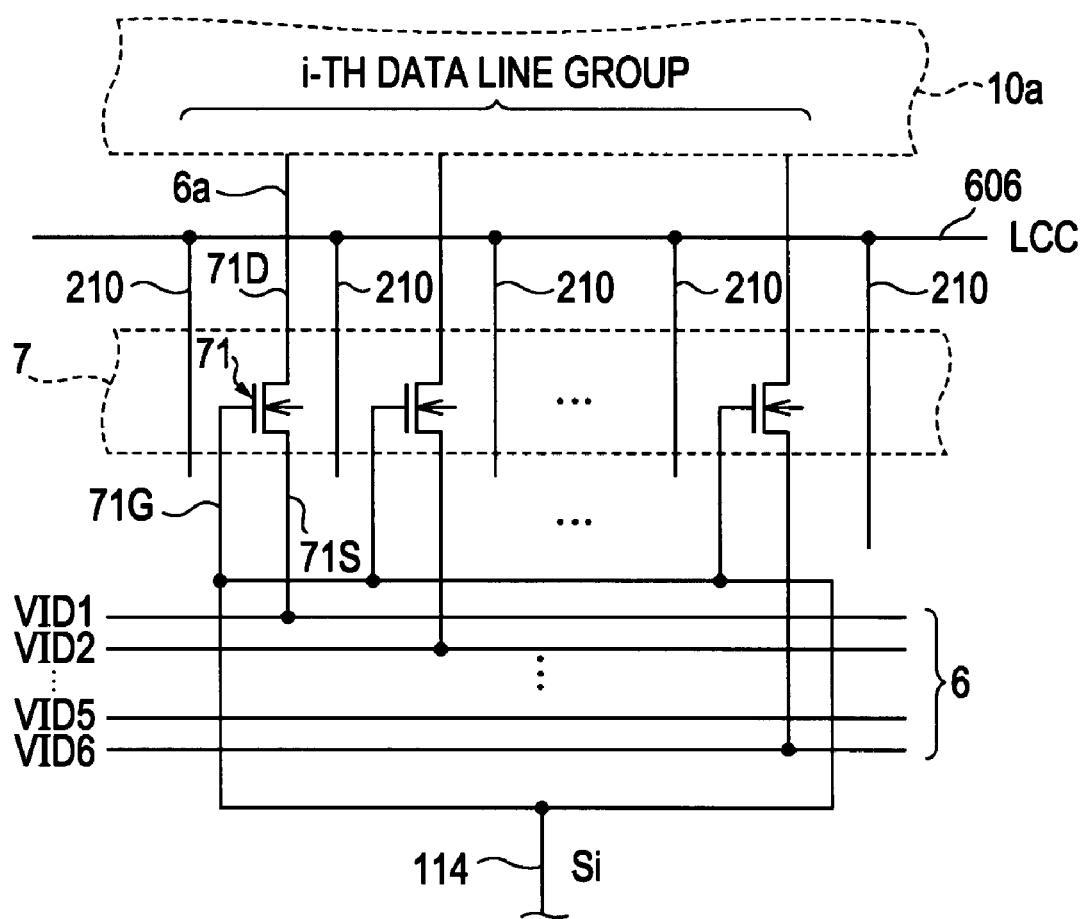
FIG. 4 is a diagram illustrating the configuration of the enlarged sampling circuit and various signal lines disposed around the sampling circuit shown in FIG. 3.
Figure 4:
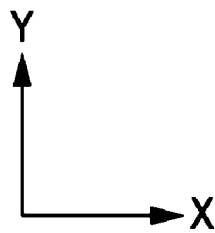

The electrical configuration of the liquid crystal device according to the first embodiment is described below with reference to FIGS. 3 and 4. FIG. 3 is a diagram schematically illustrating the electrical configuration of the liquid crystal device according to the first embodiment. FIG. 4 is a diagram illustrating the configuration of the enlarged sampling circuit 7 and various signal lines disposed around the sampling circuit 7 shown in FIG. 3.

In FIG. 3, in the image display area 10a on the TFT array substrate 10, a plurality of scanning lines 11a and a plurality of data lines 6a are arranged such that they intersect with each other. Pixel portions 9 corresponding to pixels are disposed in a matrix in association with the intersections of the scanning lines 11a and the data lines 6a. The pixel portion 9 is electrically connected to the corresponding scanning line 11a and data line 6a. The pixel portion 9 basically includes a pixel switching TFT and the pixel electrode 9a (see FIG. 2). The pixel switching TFT selectively applies an image signal supplied from the data line 6a. The pixel electrode 9a applies the input image signal to the liquid crystal layer 50 (see FIG. 2) and stores the image signal therein, i.e., it forms a liquid crystal holding capacitor together with the counter electrode 21 (see FIG. 2). The pixel portion 9 may include a storage capacitor added in parallel with the liquid crystal holding capacitor to prevent a leakage of the image signal stored in the liquid crystal holding capacitor.

In FIG. 3, the data line drive circuit 101, the sampling circuit 7, and the scanning line drive circuits 104 are disposed in the peripheral area on the TFT array substrate 10.

A Y clock signal CLY (and an inverted Y clock signal CLYinv, which is the inverted signal of the Y clock signal CLY) and a Y start pulse DY are supplied to the scanning line drive circuits 104 from an external circuit (not shown) through the external circuit connecting terminals 102 (see FIG. 1). Upon receiving the Y start pulse DY, the scanning line drive circuits 104 sequentially generate scanning signals in synchronization with the Y clock signal CLY and the inverted Y clock signal CLYinv and output the scanning signals to the scanning lines 11a.

An X clock signal CLX (and an inverted X clock signal CLXinv, which is the inverted signal of the X clock signal CLX) and an X start pulse DX are supplied to the data line drive circuit 101 from an external circuit through the external circuit connecting terminals 102 (see FIG. 1). Upon receiving the X start pulse DX, the data line drive circuit 101 sequentially generates sampling signals S1, . . . , Sn in synchronization with the X clock signal CLX and the inverted X clock signal CLXinv and outputs the sampling signals to sampling signal lines 114.

The sampling circuit 7 includes switching elements (i.e., sampling switches), one being associated with each data line 6a, for selecting the data line 6a to which an image signal is supplied from an image signal line 6. The switching operations of the sampling switches are controlled by the sampling signals S1, . . . , Sn supplied from the data line drive circuit 101.

Six parallel image signals VID1 through VID6 after being subjected to serial-to-parallel conversion are supplied to the sampling circuit 7 from the external circuit via the six image signal lines 6. The six image signal lines 6 are laid out from the external circuit connecting terminals 102 by bypassing the data line drive circuit 101 and are arranged in the direction in which the scanning lines 11a are disposed (i.e., X direction).

The number of image signals to be expanded in parallel is not restricted to six. Alternatively, a temporally serial image signal may be expanded into 9, 12, 24, 48, 96, . . . parallel image signals.

The switching elements of the sampling circuit 7 are specifically formed, as shown in FIG. 4, as sampling TFTs 71.

The sampling TFTs 71 are examples of "a plurality of transistors" in embodiments of the invention. For the sake of simplicity, in FIG. 4, among the plurality of sampling TFTs 71 included in the sampling circuit 7, only the sampling TFTs 71 associated with the data lines 6a belonging to the i-th data line group are shown as a typical example. Although only the sampling TFTs 71 associated with the data lines 6a belonging to the i-th data line group are discussed below, other data line groups are constructed in a manner similar to the i-th data line group.

A source wiring 71S of each of the six sampling TFTs 71 associated with the six data lines 6a belonging to the i-th data line group is electrically connected to one of the six image signal lines 6.

A drain wiring 71D of each sampling TFT 71 is electrically connected to one of the six data lines 6a belonging to the i-th data line group.

A gate wiring 71G including the gate electrode of each sampling TFT 71 is electrically connected to the sampling signal line 114, and receives the i-th sampling signal Si from the data line drive circuit 101 (see FIG. 3).

With this configuration, the sampling TFTs 71 supply the image signals VID1 through VID6 to each data line group (or block) including six data lines 6a in accordance with the sampling signal Si. Accordingly, six data lines 6a of each data line group can be simultaneously driven, and thus, the drive frequency can be suppressed.

Various timing signals, such as the clock signals CLX and CLY, are generated in a timing generator formed in an external circuit (not shown), and are supplied to various circuits via the external circuit connecting terminals 102 on the TFT array substrate 10. Power necessary for driving the drive circuits is also supplied from the external circuit.

Referring back to FIG. 3, in the peripheral area of the TFT array substrate 10, a counter electrode potential line 605 is laid out from the external circuit connecting terminals 102 to the conducting terminals 106. The counter electrode potential line 605 supplies a counter electrode potential LCC, which is an example of a "common potential" in embodiments of the invention, from an external circuit. With this configuration, the counter electrode potential LCC is supplied to the counter electrodes 21 via the conducting terminals 106 and the conducting members 107 (see FIG. 1). The counter electrode potential LCC serves as the reference potential for the counter electrodes 21. Because of this reference potential, the counter electrodes 21 can form the liquid crystal holding capacitor by suitably maintaining the potential difference with the pixel electrodes 9a. In this embodiment, the 1H-inversion drive method is employed. In this method, the potential polarities of the image signals VID1 through VID6 are inverted at regular intervals between the high-potential positive polarity and the low-potential negative polarity with respect to the counter electrode potential LCC. More specifically, the potential polarities of the image signals VID1 through VID6 are inverted in the following manner. During the display of one frame, a potential having the positive polarity with respect to the counter electrode potential LCC is supplied to the pixel portions 9 in the odd-numbered rows, while a potential having the negative polarity with respect to the counter electrode potential LCC is supplied to the pixel portions 9 in the even-numbered rows. Then, during the display of the subsequent frame, conversely, the potential having the positive polarity with respect to the counter electrode potential LCC is supplied to the pixel portions 9 in the even-numbered rows, while the potential having the negative polarity with respect to the counter electrode potential LCC is supplied to the pixel portions 9 in the odd-numbered rows. That is, the potential polarities of the image signals VID1 through VID 6 are inverted so that the potential with the same polarity is supplied to the pixel portions 9 in one row, while the potential with the polarity different from that supplied to the above row of the pixel portions 9 is supplied to the pixel portions 9 in the adjacent row. As stated above, the relationship between the positive and negative potential polarities is inverted in frame cycles.

In this embodiment, a counter electrode potential branched wiring 606, which is electrically connected to the counter electrode potential line 605, is laid out in the direction in which the scanning lines 11*a* are arranged (i.e., X direction).

In this embodiment, particularly, a light-shielding film 210 is formed, as shown in FIGS. 3 and 4, in the peripheral area on the TFT array substrate 10. The light-shielding film 210 is provided for each gap between adjacent sampling TFTs 71.

The light-shielding film 210 is disposed while extending along the data line 6*a* or the drain wiring 71D (i.e., Y direction). The light-shielding film 210 is electrically connected to the counter electrode potential branched wiring 606 to which the counter electrode potential LCC is supplied.

Figure 5:
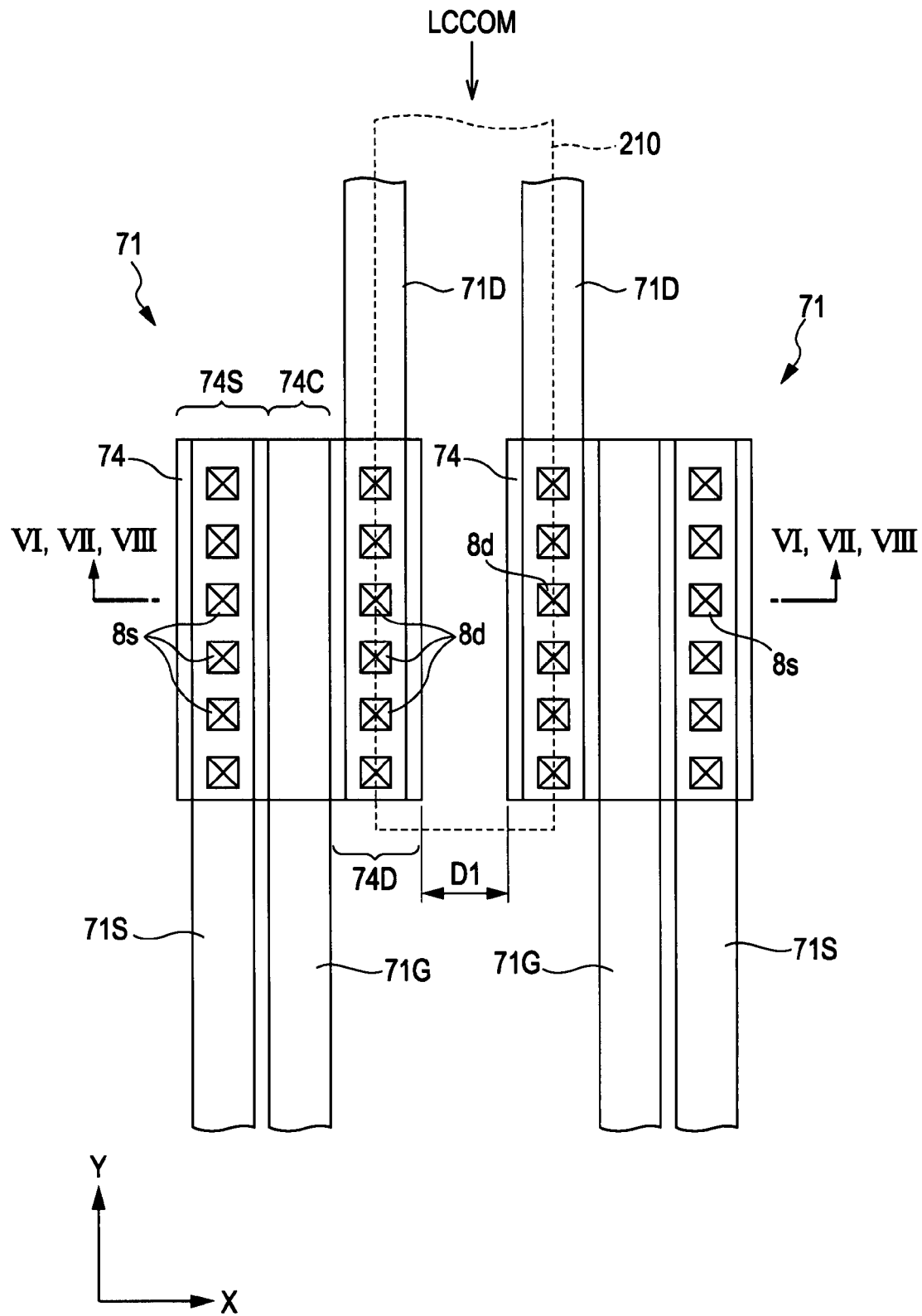
FIG. 5 is a plan view illustrating the configurations of two adjacent TFTs and a light-shielding film disposed between the two adjacent sampling TFTs.
Figure 6:
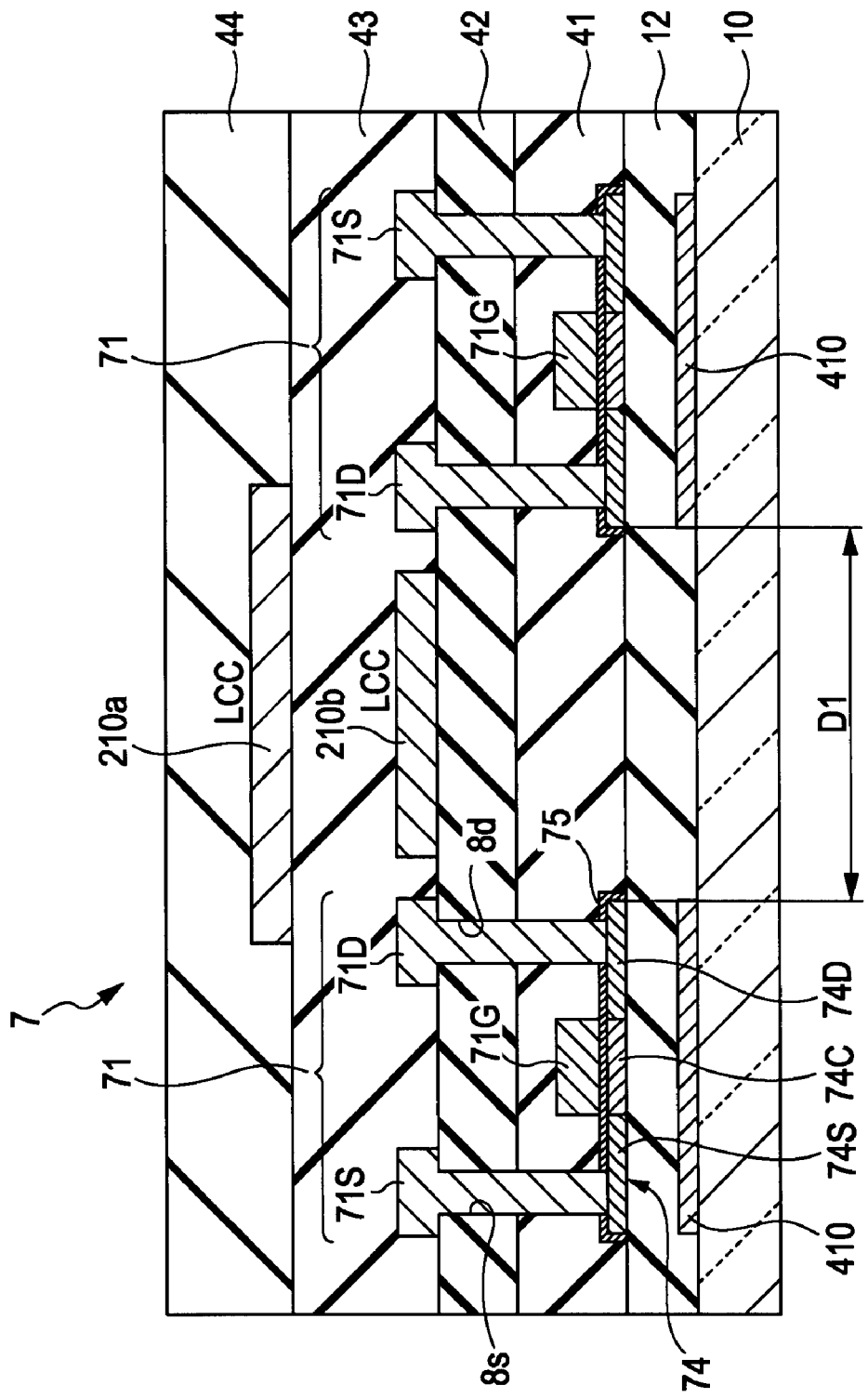
FIG. 6 is a sectional view taken on lines VI, VII, and VIII of FIG. 5.

A description is now given, with reference to FIGS. 5 and 6, of the specific configurations of the sampling TFTs 71 and the light-shielding film 210 in the first embodiment. FIG. 5 is a plan view illustrating the configuration of two adjacent sampling TFTs 71 and the configuration of the light-shielding film 210 formed between the two sampling TFTs 71. FIG. 6 is a sectional view taken on lines VI, VII, and VIII of FIG. 5. In FIG. 6, the scales of the layers and elements are different so that they can be recognized in the drawing.

In FIGS. 5 and 6, the sampling TFTs 71 are formed on an underlayer insulating film 12 provided on the TFT array substrate 10. The sampling TFT 71 includes a semiconductor layer 74, the source wiring 71S, the drain wiring 71D, the gate wiring 71G, and a gate insulating film 75.

The semiconductor layer 74 includes a channel region 74C in which a channel is formed by electric fields generated from the gate wiring 71G, a source region 74S, and a drain region 74D.

The source wiring 71S, which is made of a metallic film, such as an aluminum film, is formed on a layer higher than the semiconductor layer 74 through interlayer insulating films 41 and 42. The source wiring 71S is connected to the source region 74S through a contact hole 8*s* passing through the interlayer insulating films 41 and 42. The source wiring 71S is formed in the longitudinal direction of the data line 6*a* (i.e., Y direction). The source wiring 71S is electrically connected to the image signal line 6 through a contact hole and relay wiring (not shown). Such a connection state is shown in FIG. 4.

The drain wiring 71D is formed of the same film as the source wiring 71S. That is, the drain wiring 71D is formed of a metallic film, such as an aluminum film, on a layer higher than the semiconductor layer 74 through the interlayer insulating films 41 and 42. The drain wiring 71D is connected to the drain region 74D through a contact hole 8*d* passing through the interlayer insulating films 41 and 42. The drain wiring 71D is formed in the longitudinal direction of the data line 6*a* (i.e., Y direction). The drain wiring 71D is electrically connected to the image signal line 6 through a contact hole and relay wiring (not shown). Such a connection state is shown in FIG. 4.

The gate wiring 71G is formed of, for example, a conductive polysilicon film, on a layer higher than the semiconductor layer 74 through the gate insulating film 75. The gate wiring 71G includes a gate electrode which is overlapped with the gate wiring 71G through the channel region 74C of the semiconductor layer 74 and the gate insulating film 75. The gate wiring 71G is also formed such that it is extended in the direction in which the data line 6*a* is extended (i.e., Y direction). The gate wiring 71G is electrically connected to the sampling signal line 114 through a contact hole and relay wiring (not shown). Such a connection state is shown in FIG. 4.

In this embodiment, particularly, the light-shielding film 210 is, as shown in FIG. 5, provided in the gap region D1 between the two adjacent sampling TFTs 71. The light-shielding film 210 is extended in the longitudinal direction of the drain wiring 71D (i.e., Y direction) such that it can cover the gap region D1.

The light-shielding film 210 includes, as shown in FIGS. 5 and 6, a first light-shielding layer 210*a* and a second light-shielding layer 210*b*. The first light-shielding layer 210*a* is formed of a metallic film, such as an aluminum film, on a layer higher than the drain wiring 71D (and source wiring 71S) through the interlayer insulating film 43. The second light-shielding film 210*b* is formed of the same film as the drain wiring 71D, i.e., a metallic film, such as an aluminum film. That is, the light-shielding film 210 is a double-layered film including the first and second light-shielding layers 210*a* and 210*b*.

An interlayer insulating film 44 is formed on the first light-shielding layer 210*a* such that it can cover the entire surface of the TFT array substrate 10.

The first and second light-shielding layers 210*a* and 210*b* are formed in the direction in which the drain wiring 71D is extended. The first and second light-shielding layers 210*a* and 210*b* are overlapped with each other, and more precisely, the first light-shielding layer 210*a* covers the second light-shielding layer 210*b*, when viewed from the top of the TFT array substrate 10. The first and second light-shielding layers 210*a* and 210*b* are electrically connected to the counter electrode potential branched wiring 606 through a contact hole and relay wiring (not shown). Such a connection state is shown in FIG. 4. The first and second light-shielding layers 210*a* and 210*b* may be connected to each other with one or a plurality of contact holes passing through the interlayer insulating film 43.

The first light-shielding layer 210*a* is formed such that it covers the gap region D1 between two adjacent sampling TFTs 71 and such that it is partially overlapped with the semiconductor layer 74 of each of the two adjacent sampling TFTs 71 when viewed from the top. Accordingly, the number of occurrences of light leakage in the gap region D1 between the two adjacent sampling TFTs 71 can be reduced. More specifically, oblique light may be contained (about ten-odd per cents) in light emitted from an external light source and incident on the liquid crystal device, or light may be reflected on the back surface of the TFT array substrate 10 or light emitted from another liquid crystal device in an electronic apparatus, such as a multi-panel projector, may pass through a synthetic optical system (light directing from downward to upward in FIG. 6). Such light may be reflected by another part (for example, the frame-like light-shielding film 53 disposed on the counter substrate 20 shown in FIG. 1 or 2) of the liquid crystal device, resulting in diffused reflected light or stray light (light directing from upward to downward in FIG. 6), which may pass through the gap region D1 and output to the outside of the liquid crystal device. In this embodiment, even under this situation, because of the provision of the first light-shielding layer 210a, the number of occurrences of light leakage can be reduced. Thus, undesirable phenomena occurring in displaying images, such as a streak-like white portion displayed at a position corresponding to the gap region D1 in the peripheral area, can be eliminated. As a result, high-quality image display can be implemented.

In this embodiment, particularly, the light-shielding film 210 includes, not only the first light-shielding layer 210a, but also the second light-shielding layer 210b. Accordingly, the number of occurrences of light leakage in the gap region D1 between two adjacent sampling TFTs 71 can be reduced more reliably. Additionally, since the second light-shielding layer 210b is formed of the same film as the drain wiring 71D in the gap region D1 between two adjacent sampling TFTs 71, the parasitic capacitance between the drain wirings 71D of the two sampling TFTs 71 can be reduced. In other words, the second light-shielding layer 210b serves as an electromagnetic shielding film that can reduce or prevent the electromagnetic interference between the drain wirings 71D of two adjacent sampling TFTs 71.

Also in this embodiment, particularly, since the counter electrode potential LCC is supplied to the first and second light-shielding layers 210a and 210b, the potentials of the first and second light-shielding layers 210a and 210b can be prevented from being changed, which would be caused by the electromagnetic interference from the drain wirings 71D (or gate wirings 71G or source wirings 71S). Thus, the electromagnetic interference between the drain wirings 71D of two adjacent sampling TFTs 71 can further be reduced. As a result, the number of occurrences of irregularities in the luminance represented by streak-like white portions at positions corresponding to the data lines in the image display area 10a can be reduced.

Additionally, in this embodiment, as stated above, the counter electrode potential LCC is supplied to the first and second light-shielding layers 210a and 210b. Thus, as in this embodiment, even when an inversion drive method is employed, the first and second light-shielding layers 210a and 210b can function as an electromagnetic shielding film. As stated above, in the 1H-inversion drive method, the potential polarities of the image signals VID1 through VID6 are inverted with respect to the counter electrode potential LCC in predetermined cycles. That is, the first and second light-shielding layers 210a and 210b are maintained at the counter electrode potential LCC, which is used as the reference for the polarity inversion of the image signals VID1 through VID6. Accordingly, the potential difference between each of the first and second light-shielding layers 210a and 210b and the drain wiring 71D or the source wiring 71S can be made smaller, compared with a case where the first and second light-shielding layers 210a and 210b are maintained at a potential different from the counter electrode potential LCC. As a result, the electromagnetic interference between each of the first and second light-shielding layers 210a and 210b and the drain wiring 71D or the source wiring 71S can be reduced.

In FIG. 6, in this embodiment, particularly, a plurality of lower light-shielding films 410 are formed at a layer lower than the semiconductor layer 74. The lower light-shielding films 410 are formed of a light-shielding conductive material, such as an elemental metal consisting of one of high-melting point metals, such as titanium (Ti), chromium (Cr), tungsten (W), tantalum (Ta), and molybdenum (Mo), or an alloy, a metallic silicide, or a polysilicide consisting of at least one of the above-described high-melting point metals, or a laminated body thereof. The plurality of lower light-shielding films 410 are formed generally in the same planar configuration as the semiconductor layers 74 such that they are overlapped with the corresponding semiconductor layers 74 when viewed from the top of the TFT array substrate 10. The lower light-shielding films 410 are disposed with the gap region D1 therebetween. This can prevent light reflected on the back surface of the TFT array substrate 10 or light emitted from another liquid crystal device in an electronic apparatus, such as a multi-panel projector, and passing through a synthetic optical system from being incident on the plurality of sampling TFTs 71. As a result, the generation of an optical leakage current caused by the above-described returned light in the sampling TFTs 71 can be suppressed, which would otherwise cause the sampling TFTs 71 to malfunction.

Since the lower light-shielding films 410 are located with the gap region D1 therebetween, cracks in the lower light-shielding films 410, which would occur in a case where the plurality of lower light-shielding films 400 are formed as one continuous film, can be suppressed. This increases the reliability of the liquid crystal device.

Additionally, the provision of the lower light-shielding films 410 can inhibit diffused reflected light or stray light from emitting from a region where the semiconductor layer 74 in the sampling circuit 7 is formed.

In this embodiment, particularly, the first light-shielding layer 210a is formed, as shown in FIG. 6, such that it is partially overlapped with two adjacent lower light-shielding films 410. Thus, the provision of the first light-shielding layer 210a and the lower light-shielding film 410 can reliably reduce diffused reflected light or stray light from emitting from the peripheral area.

As described above, according to the liquid crystal device of this embodiment, the provision of the light-shielding film 210 can reduce the number of occurrences of light leakage in the gap region D1 between the sampling TFTs 71 of the sampling circuit 7. As a result, high-quality images can be displayed.

Second Embodiment

Figure 7:
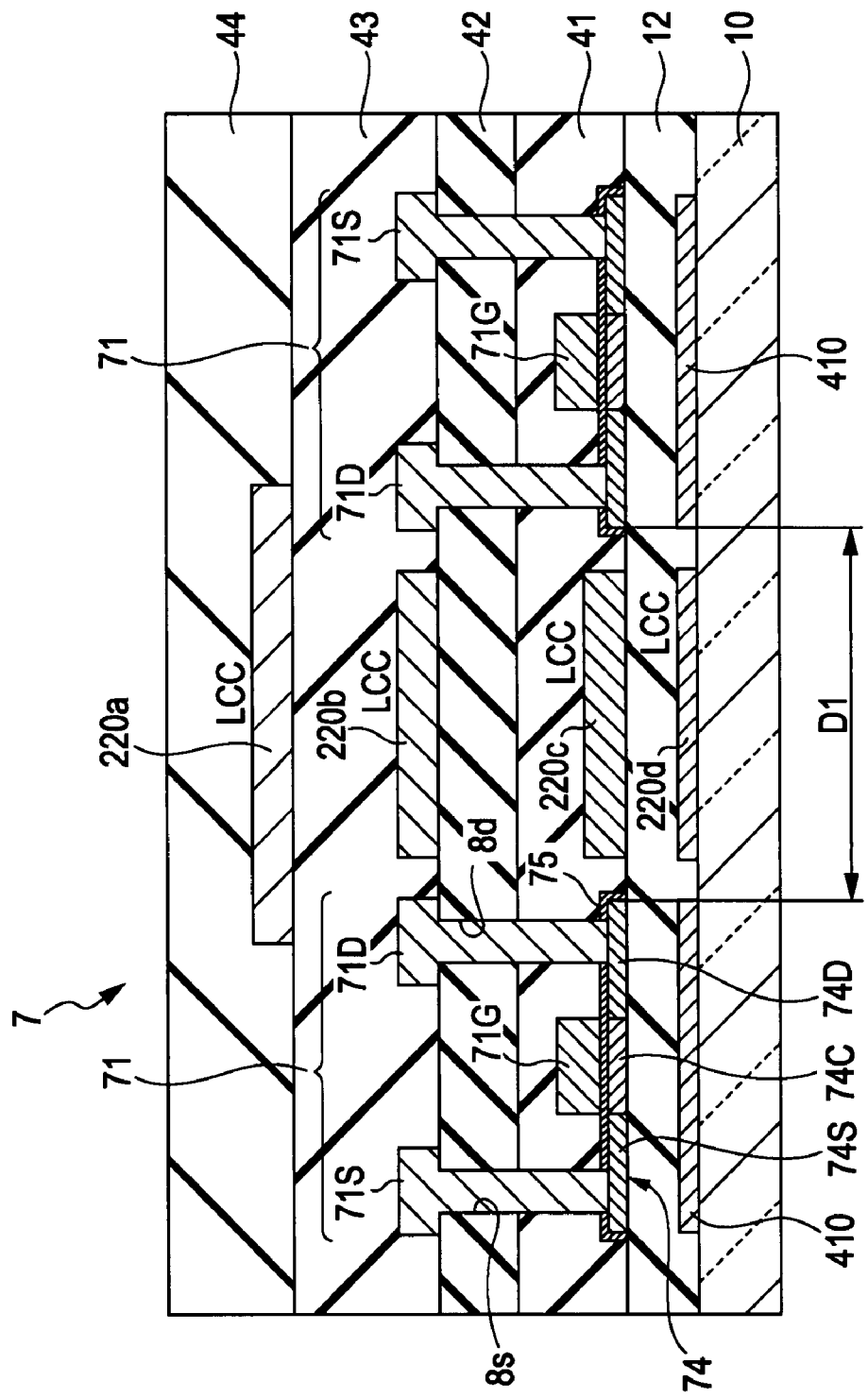
FIG. 7 is a sectional view taken on lines VI, VII, and VIII of FIG. 5 in accordance with a second embodiment of the invention.

A liquid crystal device in accordance with a second embodiment of the invention is described below with reference to FIG. 7. FIG. 7 is a sectional view taken on lines VI, VII, and VIII of FIG. 5. In FIG. 7, the scales of the layers and elements are different so that they can be recognized in the drawing. In FIG. 7, elements similar to those of the first embodiment shown in FIGS. 1 through 6 are designated with like reference numerals, and an explanation thereof is thus omitted.

The liquid crystal device shown in FIG. 7 is substantially the same as that of the first embodiment, except that, instead of the light-shielding film 210, a light-shielding film 220 is provided.

As in the light-shielding film 210 of the first embodiment, the light-shielding film 220 is formed such that it is extended in the longitudinal direction of the drain wiring 71D and such that it can cover the gap region D1 between two adjacent sampling TFTs 71.

The light-shielding film 220 includes first through fourth light-shielding layers 220a through 220d. That is, the light-shielding film 220 is formed as a quadruple-layered film including the first through fourth light-shielding layers 220a through 220d. The third and fourth light-shielding layers 220c and 220d are examples of the "shielding wiring" in embodiments of the invention.

The first and second light-shielding layers 220a and 220b are formed in a manner similar to the first and second light-shielding layers 210a and 210b, respectively, of the first embodiment.

The third light-shielding layer 220c is formed of the same film as the gate wiring 71G, for example, a conductive polysilicon film. The third light-shielding layer 220c, as well as the second light-shielding layer 220b, is formed in the gap region D1 such that it is extended in the longitudinal direction of the drain wiring 71D. Accordingly, because of the provision of the third light-shielding layer 220c, the electromagnetic interference between adjacent sampling TFTs 71 can be reduced. Additionally, the third light-shielding layer 220c is electrically connected to the second light-shielding layer 220b through a contact hole passing through the interlayer insulating films 41 and 42, and is also electrically connected to the fourth light-shielding layer 220d through a contact hole passing through the underlayer insulating film 12, though such connection states are not shown. In other words, the third light-shielding layer 220c serves as a relay layer that electrically relays the second and fourth light-shielding layers 220b and 220d. Thus, the electromagnetic interference between adjacent sampling TFTs 71 can be reduced more reliably.

The fourth light-shielding layer 220d is formed of the same film as the lower light-shielding film 410, for example, a light-shielding conductive film, such as an elemental metal consisting of one of high-melting point metals, such as Ti, Cr, W, Ta, and Mo, or an alloy, a metallic silicide, or a polysilicide consisting of at least one of the above-described high-melting point metals, or a laminated body thereof. The fourth light-shielding layer 220d, as well as the third light-shielding layer 220c, is formed in the gap region D1 such that it is extended in the longitudinal direction of the drain wiring 71D. Accordingly, the provision of the fourth light-shielding layer 220d can more reliably reduce the electromagnetic interference between adjacent sampling TFTs 71. Because of the provision of the fourth light-shielding layer 220d, light reflected on the back surface of the TFT array substrate 10 or light emitted from another liquid crystal device in an electronic apparatus, such as a multi-panel projector, and passing through a synthetic optical system can be suppressed from being incident on the plurality of sampling TFTs 71. The provision of the fourth light-shielding film 220d can further reduce the number of occurrences of light leakage in the gap region D1 between adjacent sampling TFTs 71.

Third Embodiment

Figure 8:
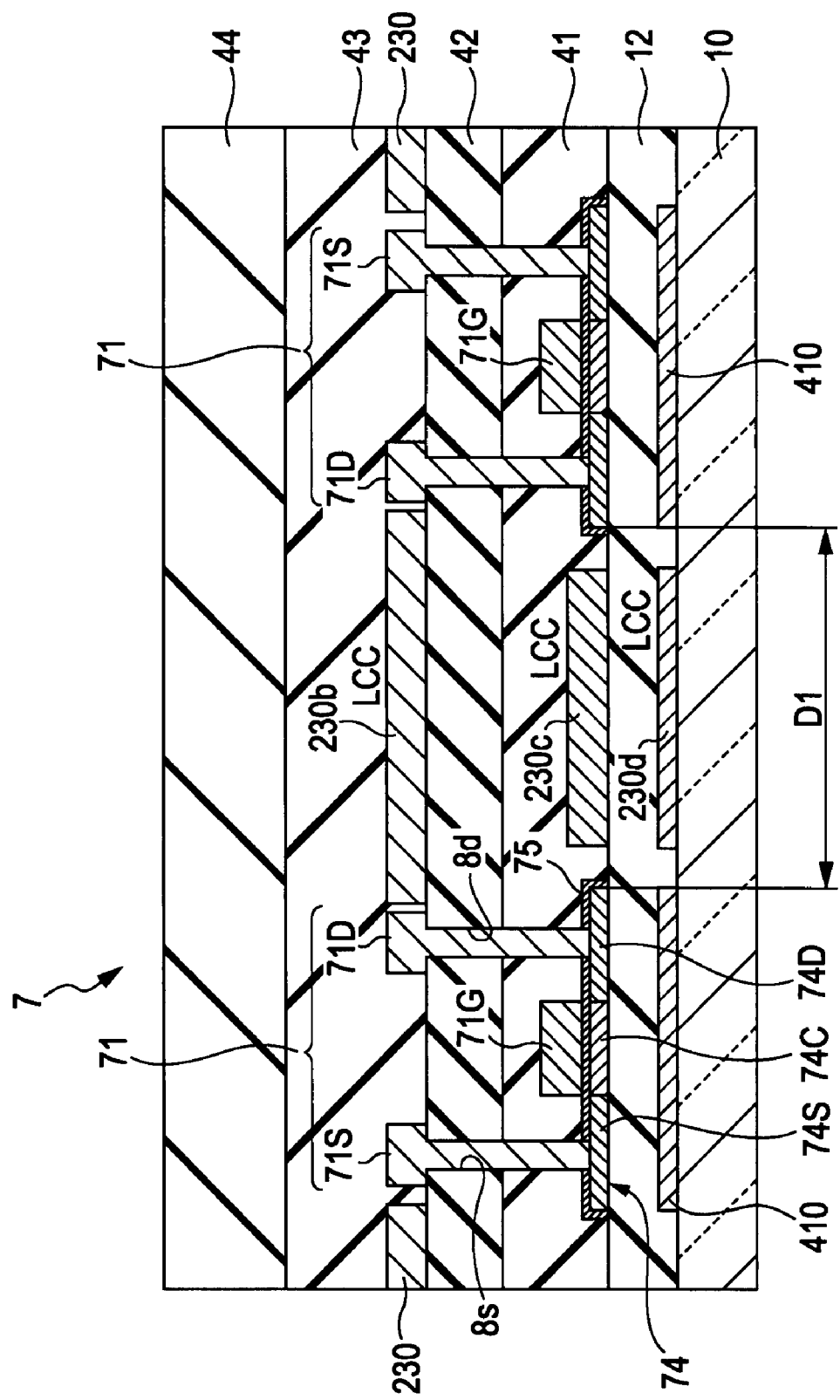
FIG. 8 is a sectional view taken on lines VI, VII, and VIII of FIG. 5 in accordance with a third embodiment of the invention.

A liquid crystal device in accordance with a third embodiment of the invention is described below with reference to FIG. 8. FIG. 8 is a sectional view taken on lines VI, VII, and VIII of FIG. 5. In FIG. 8, the scales of the layers and elements are different so that they can be recognized in the drawing. In FIG. 8, elements similar to those of the first embodiment shown in FIGS. 1 through 6 and those of the second embodiment shown in FIG. 7 are designated with like reference numerals, and an explanation thereof is thus omitted.

The liquid crystal device shown in FIG. 8 is substantially the same as that of the second embodiment, except that, instead of the light-shielding film 220, a light-shielding film 230 is provided.

As in the light-shielding film 210 or 220 of the first or second embodiment, respectively, the light-shielding film 230 is formed such that it is extended in the longitudinal direction of the drain wiring 71D and such that it can cover the gap region D1 between two adjacent sampling TFTs 71.

The light-shielding film 230 includes second through fourth light-shielding layers 230b through 230d. That is, the light-shielding film 230 is formed as a triple-layered film including the second through fourth light-shielding films 230b through 230d.

The third and fourth light-shielding layers 230c and 230d are formed in a manner similar to the third and fourth light-shielding layers 220c and 220d in the second embodiment.

The second light-shielding film 230b, as well as the second light-shielding film 210b of the first embodiment, is formed of the same film as the drain wiring 71D (and source wiring 71S), for example, a metallic film, such as an aluminum film. As in the first light-shielding layer 210a of the first embodiment, the second light-shielding layer 230b is formed such that it is partially overlapped with the semiconductor layers 74 of two adjacent sampling TFTs 71 when viewed from the top of the TFT array substrate 10. Thus, the number of occurrences of light leakage in the gap region D1 between two adjacent sampling TFTs 71 can be reduced reliably.

The drain wiring 71D and the source wiring 71S of each sampling TFT 71 have a smaller linewidth than those of the first embodiment so that the second light-shielding layer 230b can be partially overlapped with the semiconductor layers 74 of two adjacent sampling TFTs 71.

The second light-shielding layer 230b is electrically connected to the counter electrode potential branched wiring 606 through a contact hole and relay wiring (not shown), and the counter electrode potential LCC is supplied to the second light-shielding layer 230b. Accordingly, the potential of the second light-shielding layer 230b can be prevented from being changed, which would be caused by the electromagnetic interference from the drain wirings 71D (or gate wirings 71G or source wirings 71S). Thus, the electromagnetic interference between the drain wirings 71D of two adjacent sampling TFTs 71 can further be reduced. In other words, the second light-shielding layer 230b can function as an electromagnetic shielding film that can reduce the electromagnetic interference between the drain wirings 71D of adjacent sampling TFTs 71.

Electronic Apparatus

Figure 9:
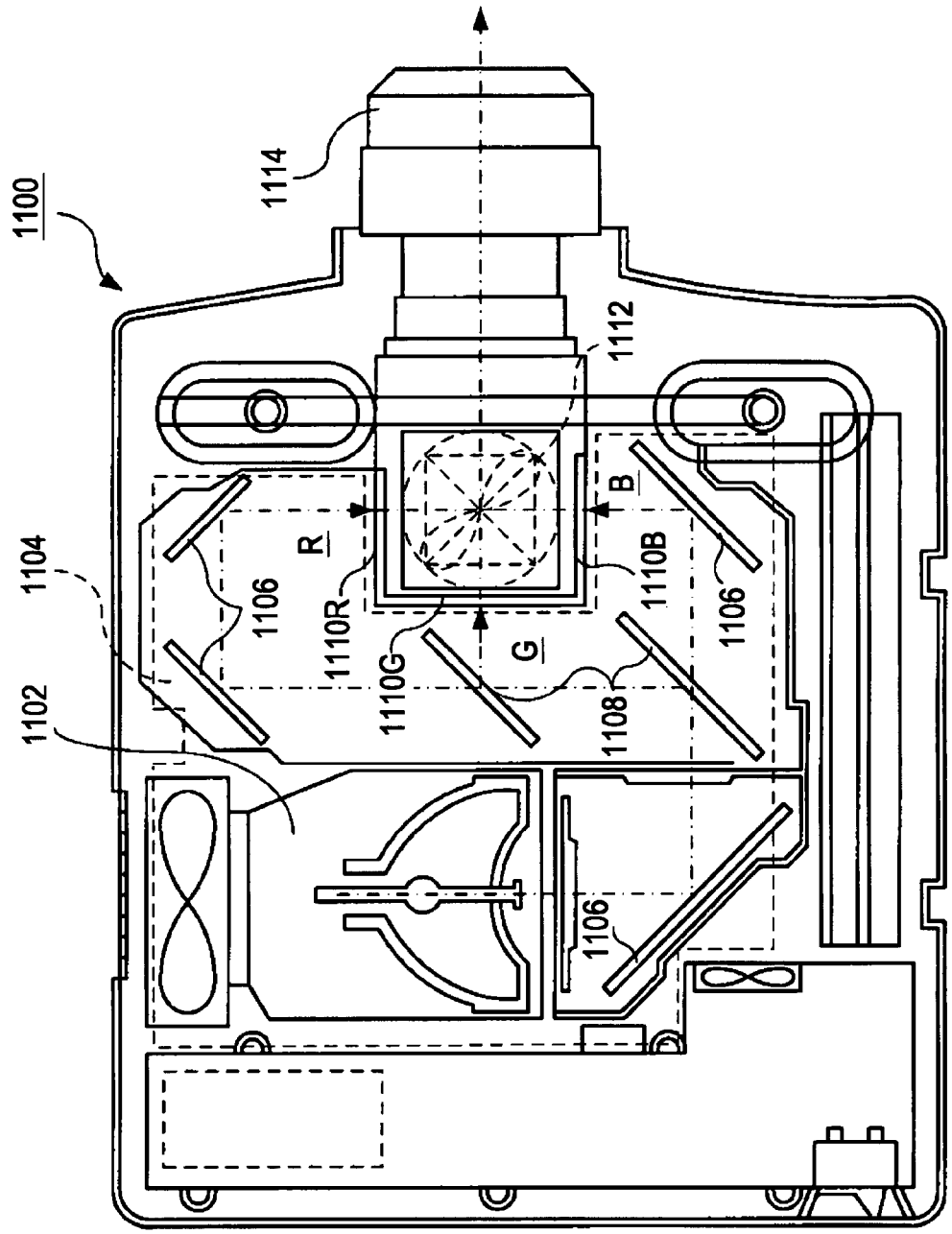
FIG. 9 is a plan view illustrating the configuration of a projector, which is an example of an electronic apparatus including the electro-optical device.

A description is now given of applications of the liquid crystal devices of the above-described embodiments to various electronic apparatuses. As one example of such electronic apparatuses, a projector using the liquid crystal devices of one of the above-described embodiments as light valves is discussed below. FIG. 9 is a plan view illustrating an example of the configuration of a projector 1100.

Inside the projector 1100, a lamp unit 1102 including a white light source, such as a halogen lamp, is disposed. Projection light emitted from the lamp unit 1102 is separated into three primary color light components, such as RGB color components, by four mirrors 1106 and two dichroic mirrors 1108 disposed in a light guide 1104, and the RGB color components are incident on liquid crystal panels 1110R, 1110G, and 1110B corresponding to the RGB colors, respectively, which serve as light valves.

The configurations of the liquid crystal panels 1110R, 1110G, and 1110B are similar to that of any of the above-described liquid crystal devices. The liquid crystal panels 1110R, 1110G, and 1110B are driven by the RGB primary color signals supplied from an image signal processing circuit. Light components modulated by the liquid crystal panels 1110R, 1110G, and 1110B are incident on a dichroic prism 1112 in the three directions. The R and B light components are refracted on the dichroic prism 1112, while the G light component passes through the dichroic prism 1112. As a result of combining the image components of the individual colors, a color image can be projected on a screen via a projection lens 1114.

With regard to the display images formed by the liquid crystal panels 1110R, 1110G, and 1110B, it is necessary that the display image generated by the liquid crystal panel 1110G be horizontally inverted with respect to the display images generated by the liquid crystal panels 1110R and 1110B.

Light components are incident on the liquid crystal panels 1110R, 1110G, and 1110B through the dichroic mirrors 1108. Thus, the provision of color filters is not necessary.

In addition to the projector 1100 discussed with reference to FIG. 9, the electronic apparatuses include mobile personal computers, cellular telephones, liquid crystal televisions, view-finder-type and monitor-direct-view-type video cassette recorders, car navigation systems, pagers, electronic personal organizers, calculators, word-processors, workstations, videophones, point-of-sale (POS) terminals, devices provided with touch panels, etc. The above-described electro-optical devices can be applied to such electronic apparatuses.

While the invention has been described with reference to exemplary embodiments, it is to be understood that the invention is not limited to the disclosed exemplary embodiments. Various modifications and alterations may occur insofar as they accord with the gist or concept of the invention which is apparent from the claims and the specification. Electro-optical devices reflecting such modifications and alterations and electronic apparatuses including such electro-optical devices are also encompassed in the technical scope of the invention.

The entire disclosure of Japanese Patent Application No. 2006-318115, filed Nov. 27, 2006 is expressly incorporated by reference herein.

What is claimed is:

1. An electro-optical device comprising:
   a substrate;
   a plurality of pixels disposed in a pixel area on the substrate;
   a plurality of scanning lines and a plurality of data lines disposed in the pixel area;
   an image signal line disposed in a peripheral area located around the pixel area to supply an image signal;
   a sampling circuit disposed in the peripheral area and including a plurality of transistors disposed in association with corresponding data lines, each transistor including a semiconductor layer formed directly on an underlayer insulating film, each semiconductor layer having (i) a source region connected to a source wiring which is electrically connected to the image signal line and which is disposed in a first direction in which the plurality of data lines are extended, (ii) a drain region connected to a drain wiring which is electrically connected to the corresponding data line and which is disposed in the first direction, and (iii) a channel region formed between the source region and the drain region, each transistor further including a gate electrode which is disposed on a dielectric layer higher than the semiconductor layer and which is overlapped with the channel region;
   an interlayer insulating film disposed above the semiconductor layer;
   a light-shielding film disposed over the interlayer insulating film and disposed at least in part of a gap region between adjacent transistors of the plurality of transistors in plan view, the light-shielding film at least partially overlapping with the semiconductor layers of the transistors in plan view, and
   a shielding wiring formed of the same film as the film forming the gate electrode, the shielding wiring being disposed in the gap region directly on the underlayer insulating film such that at least a portion of the shielding wiring is positioned between adjacent semiconductor layers.

2. The electro-optical device according to claim 1, wherein the source wiring, the drain wiring, and the light-shielding film are formed with an identical film.

3. The electro-optical device according to claim 1, further comprising a plurality of lower light-shielding films disposed on a layer lower than the semiconductor layer and disposed with the gap region such that each lower light-shielding film is overlapped with the corresponding semiconductor layer.

4. The electro-optical device according to claim 3, wherein the light-shielding film is at least partially overlapped with adjacent lower light-shielding films of the plurality of lower light-shielding films.

5. The electro-optical device according to claim 1, wherein the light-shielding film is maintained at a predetermined potential.

6. The electro-optical device according to claim 5, wherein the potential of the image signal is inverted between a high-potential positive polarity and a low-potential negative polarity with respect to a common potential in predetermined cycles, and
   the light-shielding film is maintained at the common potential as the predetermined potential.

7. An electro-optical device comprising:
   a plurality of pixels disposed in a pixel area;
   a plurality of scanning lines and a plurality of data lines disposed in the pixel area;
   an image signal line disposed in a peripheral area located around the pixel area to supply an image signal;
   a sampling circuit disposed in the peripheral area, the sampling circuit including:
      a plurality of transistors disposed in association with corresponding data lines, each transistor including a semiconductor layer, the semiconductor layer including:
         a source region connected to a source wiring which is electrically connected to the image signal line and which is disposed in a first direction in which the plurality of data lines are extended, and
         a drain region connected to a drain wiring which is electrically connected to the corresponding data line and which is disposed in the first direction,
   a first light-shielding film disposed on a layer higher than the semiconductor layer and disposed at least in part of a gap region between adjacent transistors of the plurality of transistors in plan view, the first light-shielding film at least partially overlapping with the semiconductor layers of the transistors in plan view;
   a second light-shielding film disposed on a layer lower than the semiconductor layer; and
   a third light-shielding film disposed between the first and second light-shielding films, the third light-shielding film extending across a majority of the gap region between the adjacent transistors, the third light-shielding film being electrically connected to the first and second light-shielding films.

8. The electro-optical device according to claim 7, the third light-shielding film being formed in the same layer as the source wiring and the drain wiring.

9. The electro-optical device according to claim 7, the first light-shielding film being formed wider than the second and third light-shielding film.

10. An electro-optical device comprising:
a substrate;
a plurality of pixels disposed in a pixel area on the substrate;
a plurality of scanning lines and a plurality of data lines disposed in the pixel area;
an image signal line disposed in a peripheral area located around the pixel area to supply an image signal;
a sampling circuit disposed in the peripheral area, the sampling circuit including:
    a plurality of transistors disposed in association with corresponding data lines, each transistor including a semiconductor layer,
    a source wiring connected to a source region of the semiconductor layer, the source wiring extending in a first direction and being electrically connected to the image signal line, and
    a drain wiring connected to a drain region of the semiconductor layer, the drain wiring extending in the first direction and being electrically connected to the data line;
a counter electrode potential line disposed between the sampling circuit and the pixel area, the counter electrode potential line extending in a second direction that intersects the drain wiring;
a first light-shielding film protrudes from the counter electrode potential line in the first direction between adjacent drain wirings, the first light-shielding film being disposed on a layer higher than the semiconductor layer and disposed at least in part of a gap region between adjacent transistors of the plurality of transistors in plan view, the first light-shielding film extending in the first direction and at least partially overlapping with the semiconductor layers of the transistors in plan view; and
a second light-shielding film disposed between the first light-shielding film and the substrate, the second light-shielding film extending in the first direction and overlapping with the first light-shielding film,
wherein at least one of the first light-shielding film and the second light-shielding film is electrically connected to the counter electrode potential line.

* * * * *